(12) United States Patent
Nguyen et al.

(10) Patent No.: US 11,734,924 B1
(45) Date of Patent: Aug. 22, 2023

(54) SYSTEM AND METHOD FOR ONBOARD, REAL-TIME MISSION ANALYTICS WITH ANOMALY DETECTION AND EXPLANATION

(71) Applicant: HRL Laboratories, LLC, Malibu, CA (US)

(72) Inventors: Leon Nguyen, Tarzana, CA (US); Deepak Khosla, Camarillo, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 229 days.

(21) Appl. No.: 17/195,638

(22) Filed: Mar. 8, 2021

Related U.S. Application Data

(60) Provisional application No. 63/027,808, filed on May 20, 2020.

(51) Int. Cl.
*G06T 7/292* (2017.01)
*G06V 10/22* (2022.01)
*G06V 40/20* (2022.01)
*G06V 20/17* (2022.01)

(52) U.S. Cl.
CPC ............ *G06V 20/17* (2022.01); *G06T 7/292* (2017.01); *G06V 10/235* (2022.01); *G06V 40/23* (2022.01); *G06T 2200/24* (2013.01); *G06T 2207/10032* (2013.01); *G06T 2207/20084* (2013.01); *G06T 2207/30196* (2013.01); *G06T 2207/30212* (2013.01)

(58) Field of Classification Search
None
See application file for complete search history.

(56) References Cited

U.S. PATENT DOCUMENTS

2009/0087029 A1* 4/2009 Coleman .............. G06V 10/255
382/103
2014/0085545 A1* 3/2014 Tu ........................ G06K 9/6292
348/E9.047

OTHER PUBLICATIONS

M. Rabah, A. Rohan, S. A. S. Mohamed and S.-H. Kim, "Autonomous Moving Target-Tracking for a UAV Quadcopter Based on Fuzzy-PI," in IEEE Access, vol. 7, pp. 38407-38419, 2019, doi: 10.1109/ACCESS.2019.2906345. (Year: 2019).*
K. Boudjit and C. Larbes, "Detection and target tracking with a quadrotor using fuzzy logic," 2016 8th International Conference on Modelling, Identification and Control (ICMIC), 2016, pp. 127-132, doi: 10.1109/ICMIC.2016.7804285. (Year: 2016).*
J. Redmon and A. Farhadi, "YOLOv3: An Incremental Improvement," 2018, pp. 1-6.

(Continued)

*Primary Examiner* — Idowu O Osifade
(74) *Attorney, Agent, or Firm* — Tope-McKay & Associates

(57) ABSTRACT

Described is a system for onboard, real-time, activity detection and classification. During operation, the system detects one or more objects in a scene using a mobile platform and tracks each of the objects as the objects move in the scene to generate tracks for each object. The tracks are transformed using a fuzzy-logic based mapping to semantics that define group activities of the one or more objects in the scene. Finally, a state machine is used to determine whether the defined group activities are normal or abnormal phases of a predetermined group operation.

27 Claims, 12 Drawing Sheets

(56) References Cited

OTHER PUBLICATIONS

C.-Y. Wang, H.-Y. Mark Liao, P.-Y. Chen and J.-W. Hsieh, "Enriching Variety of Layer-Wise Learning Information by Gradient Combination," in The IEEE International Conference on Computer Vision (ICCV) Workshops, 2019, pp. 2477-2484.

S.-E. Wei, V. Ramakrishna, T. Kanade and Y. Sheikh, "Convolutional Pose Machines," in The IEEE Conference on Computer Vision and Pattern Recognition (CVPR), 2016, pp. 4724-4732.

J. F. Henriques, R. Caseiro, p. Martins and J. Batista, "High-Speed Tracking with Kernelized Correlation Filters," IEEE Transactions on Pattern Analysis and Machine Intelligence, vol. 37, pp. 583-596, 3 2015.

L. A. Zadeh, "Fuzzy sets," Information and Control, vol. 8, pp. 338-353, 3 1965.

\* cited by examiner

| Mission Phase | Message |
|---|---|
| Position | • X soldier(s) not positioned in position #1<br><br>• X soldier(s) not positioned in position #2 |
| Enter | • X soldier(s) still positioned in position #1<br><br>• X soldier(s) still positioned in position #2 |
| Regroup | • X soldier(s) did not rendezvous |

FIG. 10

SYSTEM AND METHOD FOR ONBOARD, REAL-TIME MISSION ANALYTICS WITH ANOMALY DETECTION AND EXPLANATION

CROSS-REFERENCE TO RELATED APPLICATIONS

This application claims the benefit of and is a non-provisional patent application of U.S. Provisional Application No. 63/027,808, filed on May 20, 2020, the entirety of which is hereby incorporated by reference.

GOVERNMENT RIGHTS

This invention was made with government support under U.S. Government Contract Number N00014-15-C-0091. The government has certain rights in the invention.

BACKGROUND OF INVENTION

(1) Field of Invention

The present invention relates to a system for object detection and classification and, more specifically, to a system and method that implements a vision-based process and fuzzy logic framework for real-time detection and classification.

(2) Description of Related Art

Real-time object detection and classification can be used in a variety of scenarios. While some prior art exists, existing techniques have drawbacks. For example, Flickner and Haritaoglu devised a system to track groups of socially interrelated people, such as people waiting in a checkout line or service counter (see U.S. Pat. No. 7,688,349, which is incorporated herein by reference). Their system detects people using background subtraction methods, and they track based on a color and edge appearance model together with a mean shift tracker. A disadvantage in their work is that background subtraction methods do not work well for moving cameras, such as one placed on a quadcopter drone, since they develop a model of the background at the pixel level. Further, for group activity detection, the system of Flickner and Haritaoglu determines groups of people by analyzing the distances between them and setting a threshold, and the two group activities they use are people moving together after a group has completed a transaction, and people exiting after having completed a transaction. A disadvantage of that process is that this threshold requires setting some arbitrary distance metric that is unintuitive for the user, and manual tuning of this threshold is required in different settings.

In other prior art, Ozer presents a real-time video surveillance algorithm for crowded environments (see U.S. Pat. No. 7,526,102, which is incorporated herein by reference). Ozer also uses a background subtraction method for detection of objects, which is susceptible to a moving camera as noted above. The activity detection is a model-based approach based off of track trajectories. This is fine in a fixed scene where movement patterns do not change much, such as people at a subway station, but the work of Ozer is not easily extendable to new situations where there is not much training data.

Thus, a continuing need exists for a real-time object detection and classification system that improves upon the prior art by providing a system that (1) is more robust and is not constrained to a fixed camera, (2) that relaxes the importance of specific thresholds that the user needs to set by allowing for an intuitive and semantically defined set of rules to detect group activities, and (3) that does not require training data, where the only models for group activity detection are the fuzzy membership functions that determine how to map track trajectory statistics to semantic descriptions.

SUMMARY OF INVENTION

The present disclosure provides a system for onboard, real-time, activity detection and classification. In one aspect, the system comprises one or more processors and a memory. The memory is a non-transitory computer-readable medium having executable instructions encoded thereon, such that upon execution of the instructions, the one or more processors perform operations of detecting one or more objects in a scene using a mobile platform; tracking each of the one or more objects as the one or more objects move in the scene to generate tracks for each object; transforming the tracks using a fuzzy-logic based mapping to semantics that define group activities of the one or more objects in the scene; and determining, with a state machine, that the defined group activities are normal or abnormal phases of a predetermined group operation.

In another aspect, the system includes a graphical user interface that is operable for receiving user drawn regions on a camera's field-of-view that directs the state machine to detect location-specific group activities; and providing an overlay over the camera's field-of-view that provides feedback to a user that indicates group activity detections.

In yet another aspect, detecting the one or more objects in the scene is performed using a deep neural network.

Further, tracking each of the one or more objects is performed using a tracking algorithm that resolves tracks into various states.

wherein tracking each of the one or more objects is performed using a multi-object tracking algorithm that resolves tracks into various states.

Additionally, the state machine is defined by the semantics to determine the transition between various group activities that depend on a temporal sequence of group activities.

In another aspect, in tracking each of the objects, a two-stage linear assignment problem between object detections and tracks is solved to prioritize tracks that receive consistent object detections over tracks that receive noisy or inconsistent object detections.

Further, in transforming the tracks using a fuzzy-logic based mapping, the mapping is a fuzzy logic membership function.

In another aspect, in classifying with the state machine, a time buffer-based approach provides a predetermined amount of time for an activity to occur before defaulting to a classification of an alternate activity.

In yet another aspect, the system performs an operation of causing the mobile platform to move to maintain at least one of the objects within a field-of-view of the mobile platform.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10 is a table depicting possible explanations for abnormally executed missions that are outputted by the system;

DETAILED DESCRIPTION

Figure 1:
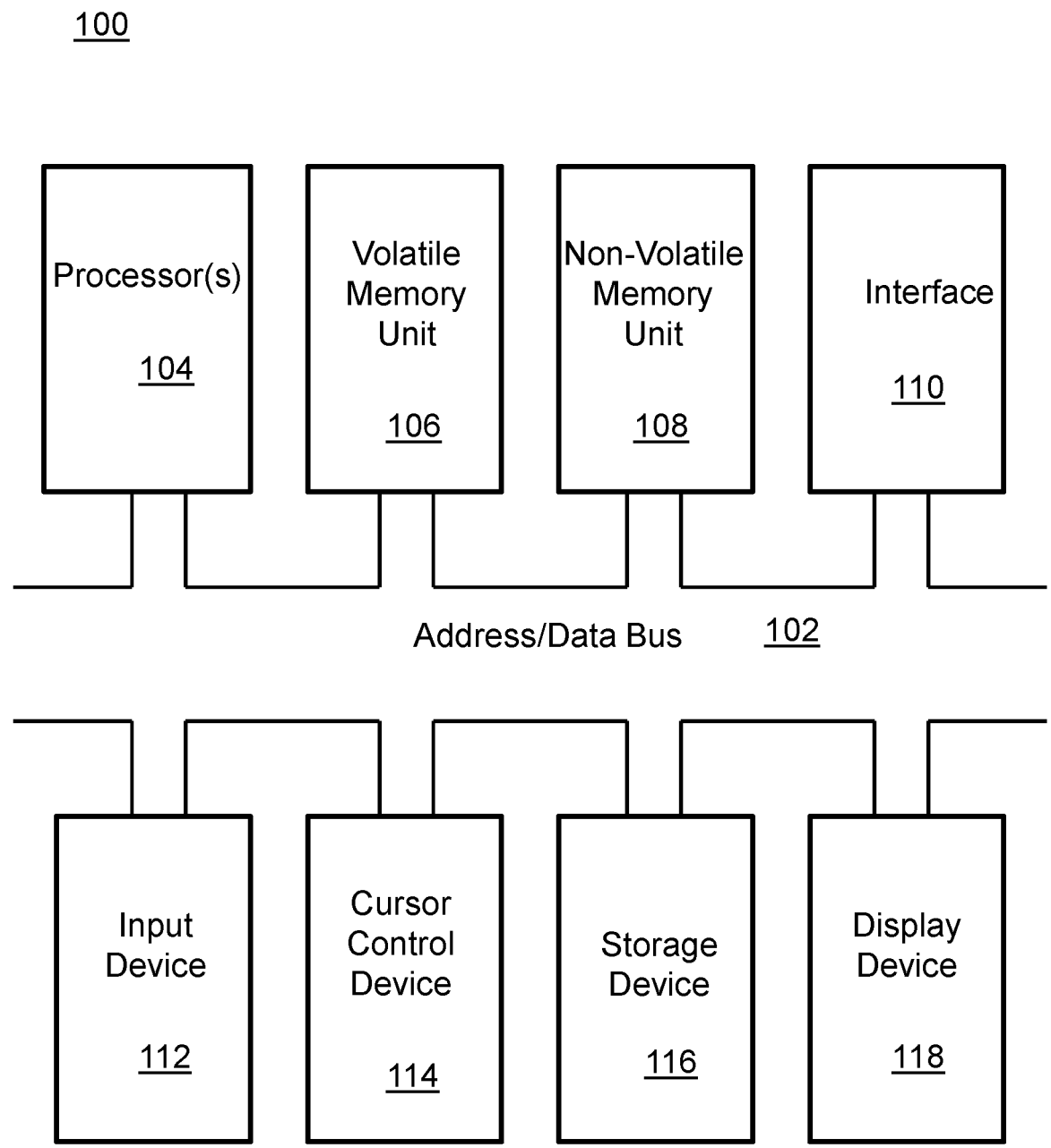
FIG. 1 is a block diagram depicting the components of a system according to various embodiments of the present invention.

The present invention relates to a system for object detection and classification and, more specifically, to a system and method that implements a vision-based process and fuzzy logic framework for real-time detection and classification. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. J. Redmon and A. Farhadi, YOLOv3: *An Incremental Improvement*, 2018.

2. C.-Y. Wang, H.-Y. Mark Liao, P.-Y. Chen and J.-W. Hsieh, "Enriching Variety of Layer-Wise Learning Information by Gradient Combination," in *The IEEE International Conference on Computer Vision (ICCV) Workshops*, 2019.

3. S.-E. Wei, V. Ramakrishna, T. Kanade and Y. Sheikh, "Convolutional Pose Machines," in *The IEEE Conference on Computer Vision and Pattern Recognition (CVPR)*, 2016.

4. J. F. Henriques, R. Caseiro, P. Martins and J. Batista, "High-Speed Tracking with Kernelized Correlation Filters," *IEEE Transactions on Pattern Analysis and Machine Intelligence*, vol. 37, pp. 583-596, 3 2015.

5. L. A. Zadeh, "Fuzzy sets," *Information and Control*, vol. 8, pp. 338-353, 3 1965.

(2) Principal Aspects

Various embodiments of the invention include three "principal" aspects. The first is a system for onboard, real-time, detection and classification. The system is typically in the form of a computer system operating software or in the form of a "hard-coded" instruction set. This system may be incorporated into a wide variety of devices (e.g., drones, unmanned aerial vehicles, etc.) that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices having such processors, such as autonomous platforms) can be associated with one or more associated memories, where each associated memory is a non-transitory computer-readable medium. Each associated memory can be associated with a single processor 104 (or associated device), or a network of interacting processors 104 (or associated devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
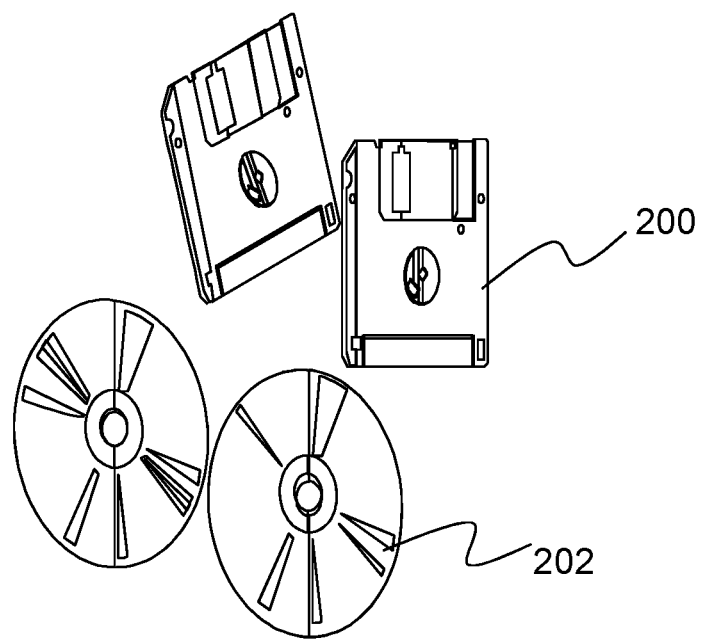
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present disclosure is directed to a system and method that implements a vision-based process and fuzzy logic framework for real-time detection and classification of mission phases that are carried out by multiple operational units (e.g., unmanned aerial vehicles, autonomous vehicles, players on a field, soldiers, etc.). The system can classify between different types of defined missions and can further detect if the mission is executed correctly or incorrectly. It can also explain the possible root causes for the incorrect or anomalous mission phase via a simple textual description. A unique aspect of the process as described herein is that it can be run in real-time on a low-size, weight and power (SWaP), credit card-sized processor that can be mounted on an aerial-based vision platform, such as a quadcopter. An additional unique aspect is that the method is easily extendable to detect new mission phases and objectives; due to the fuzzy logic state machine framework, the method can be used to define new mission phases by a semantic description of the expected formations and patterns of movement by the operational units. An end-user can monitor a video feed of the scene of the mission, where the system places processed overlays that detail mission detections and classifications. Finally, the onboard mission analytics can be easily coupled with UAV autonomous behaviors (e.g., if an incorrect number of operational units (e.g., soldiers, etc.) are positioned at left of the building, causing the UAV to automatically maneuver to a new position for a better camera view).

The system and method as described herein provides low-SWaP aerial-based vision systems, such as quadcopters, the ability to provide status updates of missions involving manned-unmanned formations being carried out by military personnel on the ground. Manned-unmanned formations are formations that have both "manned" elements (e.g., actual military troops, military people in vehicles, etc.) and "unmanned" components (e.g., autonomous drones). The operator receiving the updates can then alter the course of the mission based off of the system's processed video output. Current systems on such real-time aerial platforms are only capable of simple vision capabilities, such as object detection. This system and method of the present disclosure builds upon object detection by tracking multiple objects and then executing a state machine to resolve activities, such as mission phases, indicated by the fuzzy logic characteristics of each track.

Prior art has been largely limited to basic object detection. In improving over the prior art and to successfully detect and classify group activities, such as manned-unmanned mission formations, the system/method of the present invention needs to characterize the nature of the general problem to find a suitable solution. Although some example scenarios (e.g., missions) have a simple binary success metric (success or failure), there are various ways to accomplish the missions (e.g., perhaps to avoid conflict, the groups of soldiers might not follow the most straightforward path to the various positions defined by the mission objectives). Additionally, for the same type of mission, say "position", there is naturally a plethora of paths, or trajectories, that the soldiers will take due to varying geography and the location where the mission is to be completed. The various types of path variations, buildings, vegetation, obstructions, etc. possible in this type of mission makes model-based approaches difficult due to the large variation and the cost to record data. On the other hand, a pure rule-based approach becomes cumbersome and difficult to generalize with all of the possible variations. Further, with a rule-based approach, there are many thresholds that need to be defined relating either to a person's position, speed, pose, etc., or to similar statistics between two or more people. Most prior approaches fall within these two methods.

A compromise between the two approaches is the fuzzy logic-based system of the present disclosure, which allows for detected objects to have soft memberships to certain attributes that can be modelled and semantically defined. These semantic attributes can be easily used to construct rules in order to detect the activities of interest. Examples of such semantic attributes include how fast an object is moving, how far away two objects are from each other, and how the relative heading of two objects compare with each other. These attributes are not defined by arbitrary numbers and thresholds in the algorithm—instead, a user can use intuitive semantic descriptions such as "slow", "far", and "same direction". This makes it easy to extend the algorithm to detect new activities, and it is not tethered by solutions that depend on fixed cameras and a fixed environment to observe. Specific details regarding the system and method are provided below.

(4) Specific Details of Various Embodiments

As noted above, the present disclosure provides a system and method that implements a vision-based process and fuzzy logic framework for real-time detection and classification. The steps in the method are (1) object detection, (2) object tracking, (3) fuzzy logic inference of high-level activities, and (4) state machine reasoning on the high-level activities to deduce the current phase of a mission or other operation. The process is described in further detail below, with an example implementation for illustrative purposes that allows for operation on an NVIDIA Jetson TX2 computer onboard a quadcopter. Although not limited thereto, the programming language used was Python.

(4.1) Object Detection

The method begins by implementing a frame-by-frame objection detector. While many object detectors can be used, the system was implemented using a neural network architecture called Tiny YOLO v3 (see the List of Incorporated Literature References, Literature Reference No. 1) with Partial Residual Network connections (see Literature Reference No. 2) in the final layer. The object detector can be trained to detect any desired object. For example, the object detector was trained to detect humans by collecting approximately 50,000 video image samples from a quadcopter. Human detections were labelled for training with bounding boxes estimated via the OpenPose (see Literature Reference No. 3) pose detection neural network or via the iteratively trained models of the object detector. During runtime, the system reads input frames from the camera on a separate thread into a one-frame queue, and the object detector grabs the frame, resizes it to a 960×540 pixel resolution, and performs the forward pass. Each detection is stored in a detection class object that contains the bounding box, object label, and confidence as outputted by the neural network.

(4.2) Object Tracking

The second step is a multi-object tracking algorithm. This process encapsulates each object track into a track class object that contains the track identification (ID), bounding box, object label, track state, Kernelized Correlation Filters (KCF) (see Literature Reference No. 4) tracker object, Kalman tracking statistics, and counters for the consecutive matches and misses between the track and per-frame object detections. For further understanding, provided below are details regarding the roles of the track state, the incorporation of the per-track KCF and Kalman tracking algorithms, and how the multi-object tracking algorithm matches new object detections with current tracks.

Figure 3:
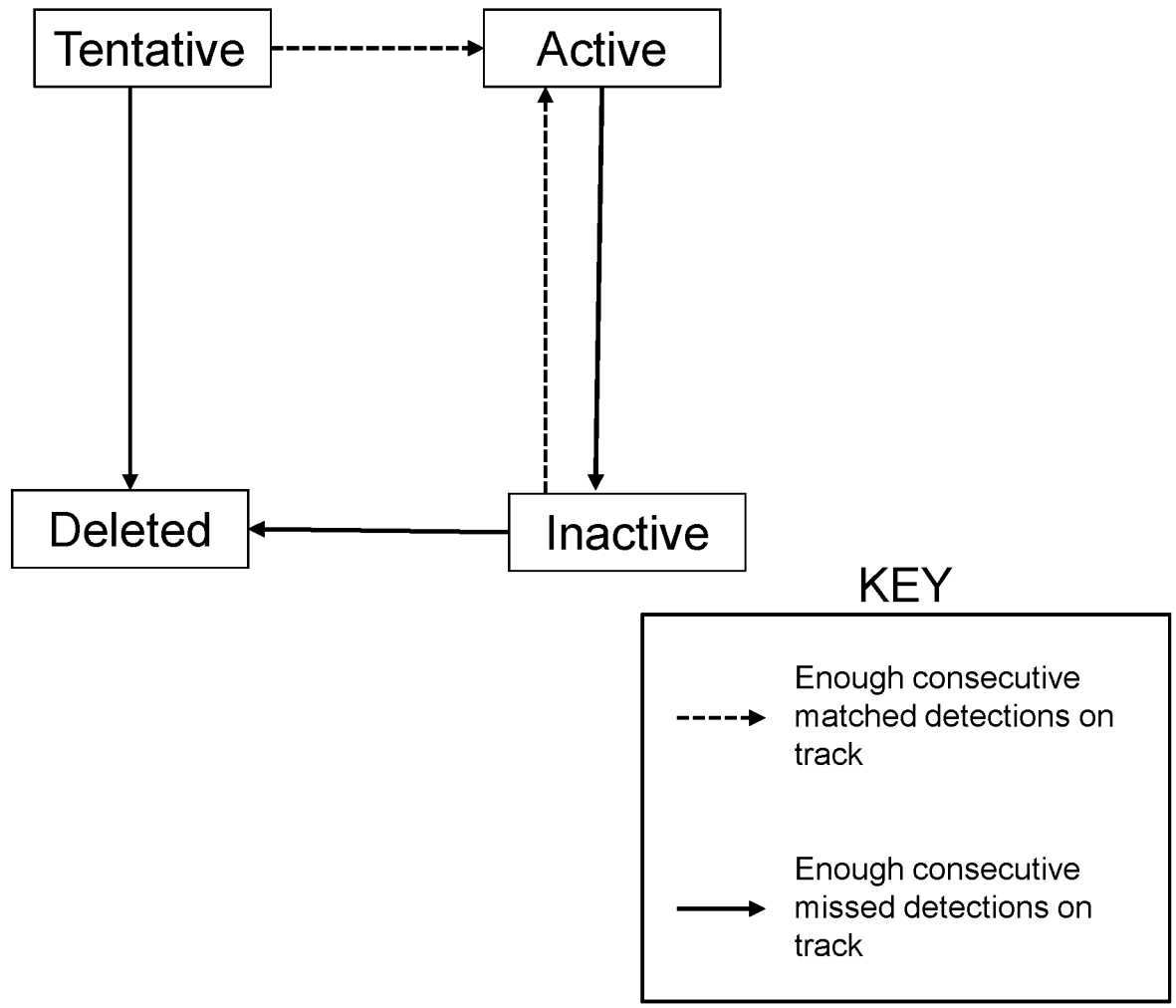
FIG. 3 is a flowchart depicting example track state transitions according to various embodiments of the present invention.

The track state is a mechanism to filter out spurious detections from forming new tracks and to retain tracks that can get lost from occlusion. There are four different track states: 'Tentative', 'Active', 'Inactive', and 'Deleted', as shown in the flowchart as depicted FIG. 3. When there is a new detection that does not belong to any current track, it becomes a 'Tentative' track until it receives enough consecutive object detection match counts to become an 'Active' track. Alternatively, if it receives enough consecutive object detection miss counts, then it becomes a 'deleted' track. This threshold is a parameter that depends on the robustness of the object detector and the processing framerate of the system, but it should be low enough so as not to require too much real-world time to have elapsed before registering a person or relevant object to a new track. Simultaneously, it should be high enough to reject spurious false positives that might receive a few consecutive detections due to a fault in the object detector's trained model. There is a similar parameter to govern when an 'Active' track becomes 'Inactive'—once the track receives enough consecutive object detection miss counts, an 'Active' track becomes 'Inactive'. However, an 'Inactive' track can become 'Active' again following a detection that matches where the Kalman filter believes the track to be—this point is elaborated in the following paragraphs. Lastly, additional parameters dictate when 'Tentative' or 'Inactive' tracks reach the 'Deleted' state, and such tracks are removed from the multi-object tracker in the following loop. The thresholds can be defined by the user of the system or preset as desired.

The use of the per-track KCF tracker and the Kalman filter perform the actual tracking in the multi-object tracking algorithm. Although not limited thereto, a C++ implementation of the KCF (Kernelized Correlation Filter) tracker can be used, which is called into Python via the Cython library. For each frame, the system updates the KCF tracker object for all tracks in parallel with a thread pool, and the KCF tracker returns the estimated bounding box position for its respective track for the current frame. The Kalman filter tracks the first-order parameters of the bounding box position, width, and aspect ratio for all tracks. In real-time performance, the number of frames skipped are counted between each main loop iteration to provide the time step for the Kalman filter transition matrix. The computation works in parallel across all tracks through a vectorized computation of the Kalman predict and update steps. For the update step, the Kalman filter uses as measurement input the bounding boxes estimated for the current frame by the KCF tracker. The multi-object tracking algorithm applies the KCF and Kalman filter on each track. As noted earlier, these filters continue to track 'Inactive' tracks, which can become 'Active' again if they become matched with an object detection.

This possibility of 'Inactive' tracks becoming 'Active' again occurs in the last part of the multi-object tracking algorithm, where the system matches the object detections of the current frame to the existing tracks. There are three outcomes from this process for all of the object detections and tracks involved: (1) object detections that get matched with tracks, (2) unmatched object detections, and (3) unmatched tracks. Matched object detections update the KCF, increment the consecutive matched detection counter, and reset the consecutive missed detection counter for their respective tracks; unmatched object detections become registered as new 'Tentative' tracks; and unmatched tracks increment their consecutive missed detection counter and reset their consecutive matched detection counter.

In the first part of the matching process, the system checks if there are any detections and tracks. If there are not any detections in the current frame, the existing tracks become unmatched tracks and the process finishes. If there are detections but there are not any existing tracks, then these detections become unmatched detections and the process finishes.

Figure 4:
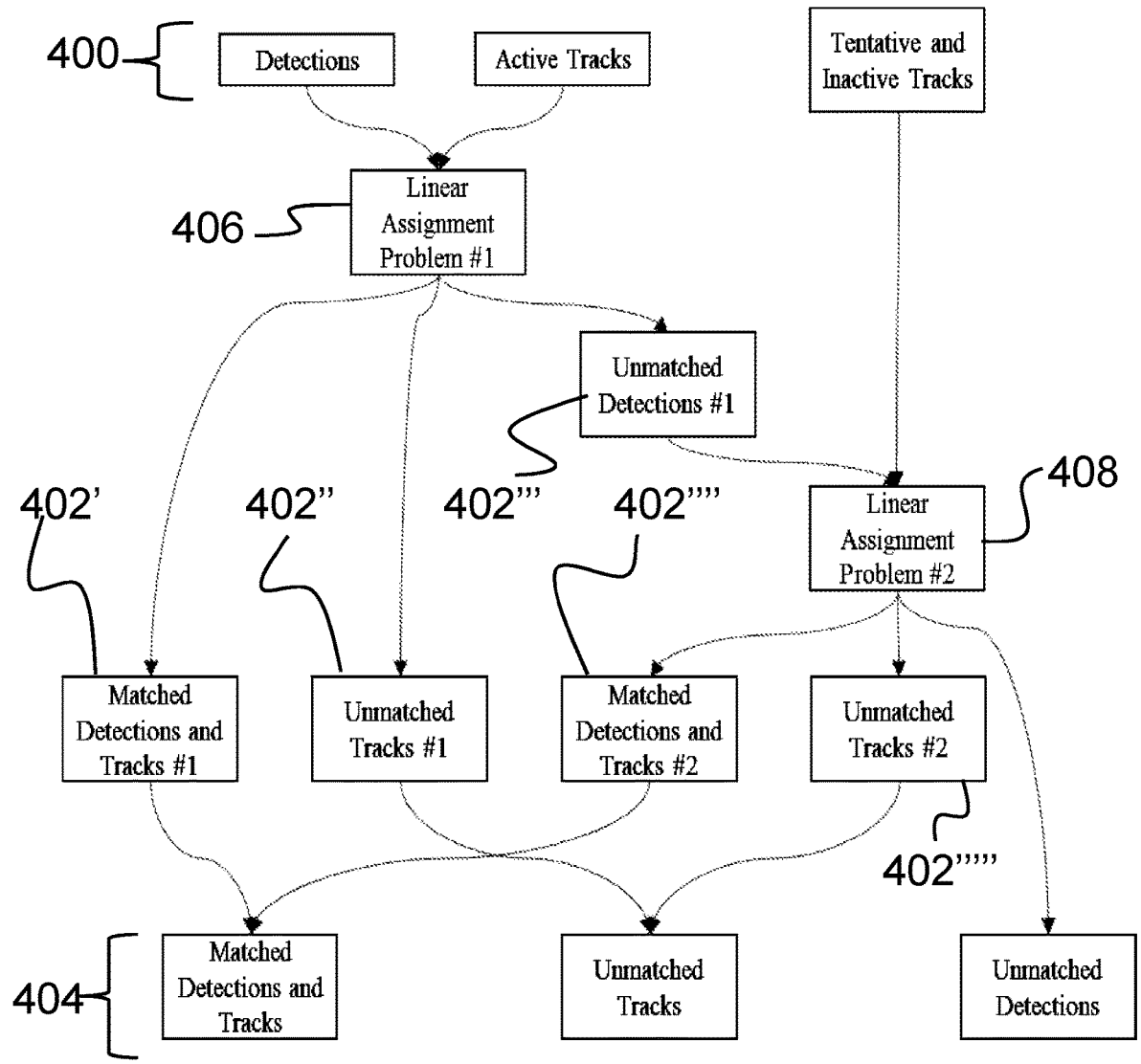
FIG. 4 is a flowchart depicting a multi-object tracker matching process between incoming object detections and existing tracks according to various embodiments of the present invention.

The second part performs the actual matching between detections and tracks, as shown in FIG. 4. FIG. 4 depicts a flowchart showing the multi-object tracker matching process between incoming object detections and existing tracks. The first set of boxes 400 represent the input, and the intermediate boxes 402 represent the intermediate results, while the final set of boxes represent the output 404.

This second part only happens if there exists both detections for the current frame and tracks. First, the Hungarian algorithm solves the linear assignment problem 406 between the detections and the 'Active' tracks, where the distance cost is one minus the Jaccard index (or intersection-over-union). A first set of matched detections and tracks come from pairs in the distance matrix with a cost below a user-specified threshold, and the remaining pairs result in unmatched detections and unmatched tracks. The user-specified threshold is, for example, a parameter/threshold set by the user on the distance between pairs of tracks. In one aspect, the possible values are within the range [0, 1], since that is the range of the cost function used here (the Jaccard index). Second, the system proceeds to a second pass of the Hungarian algorithm 408 between the unmatched detections from the first pass and the set of 'Tentative' and 'Inactive' tracks. The matched detections and tracks, unmatched detections, and unmatched tracks from the second pass get combined with those of the first pass to form the final set of outputs before the process finishes. Note that these two passes of the Hungarian algorithm 406 and 408 get performed for each unique object label in the set of current object detections and existing tracks, so that detections only get matched with tracks with the same object label. In other words, a two-stage linear assignment problem between object detections and tracks is solved to prioritize tracks that receive consistent object detections over tracks that receive noisy or inconsistent object detections.

(4.3) Fuzzy Logic

With the multi-object tracking algorithm finished, the third step of the overall method is the fuzzy logic-based inference on the tracks, which uses the track-level Kalman filter statistics to classify activities involving multiple tracks (e.g., human-human and human-object interactions). The general fuzzy logic process is known to those skilled in the art. For example, see Literature Reference No. 5.

The point of fuzzy logic is to allow for the definition of a semantic set of logic rules on the numerical set of Kalman statistics, namely the position and velocity estimates, in order to characterize higher-level activities. As a non-limiting example, the system encodes two higher-level activities in order to describe fundamental ground soldier movement in mission tactics: two people convening, and two people moving in the same direction.

To obtain this semantic description in terms of the object's position and speed, fuzzy membership functions are defined as Gaussian, sigmoidal, and polynomial functions that map quantifiable observations, such as the track speed and the distance between two tracks, to a membership value between 0 and 1. The membership value indicates how much a certain observation belongs to a certain semantic description of the observation, or fuzzy set. We map three different metrics to fuzzy sets: the track speed, the relative heading between two tracks, and the distance between two tracks. The track speed membership function domain is simply the magnitude of the Kalman filter velocity estimate. The relative angle membership function domain is the dot product of the normalized Kalman filter velocity estimate. The distance membership function domain is a bounding box width-weighted distance between the Kalman filter position estimates. The width-weighted distance is a weighted Euclidean distance, where the weight is the max of the two track's bounding box widths divided by their sum. Three membership functions are defined for each of the metrics to map to three fuzzy sets, which are the semantic notions of 'low', 'medium', and 'high' for each of the metrics—this means that for an observation of a certain metric, the evaluation of the three membership functions gives the degree to which the observation belongs to these three fuzzy sets.

Figure 5A:
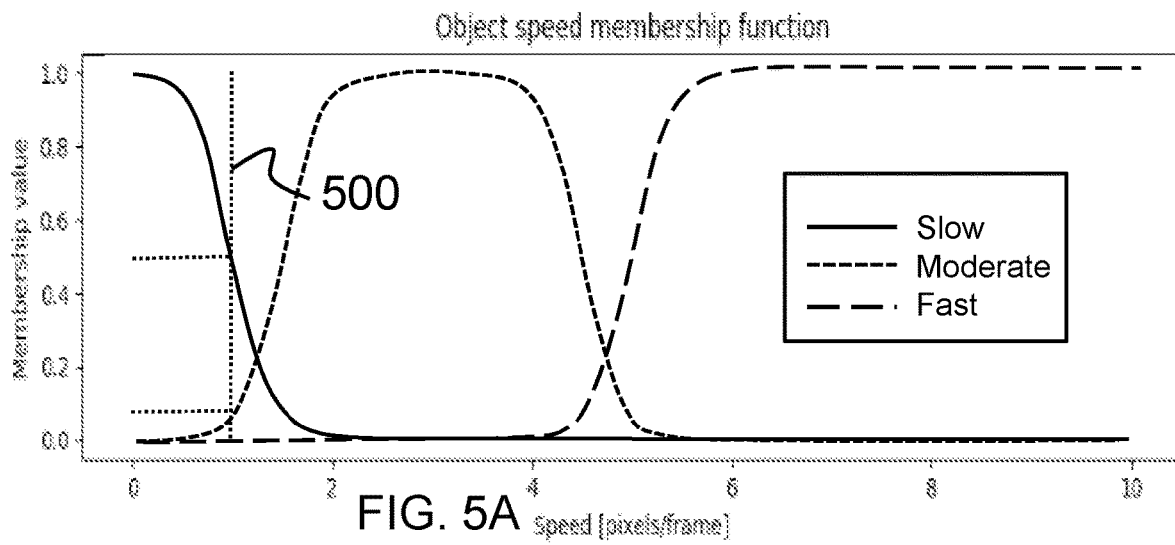
FIG. 5A is a graph depicting a fuzzy membership function for object speed.
Figure 5B:
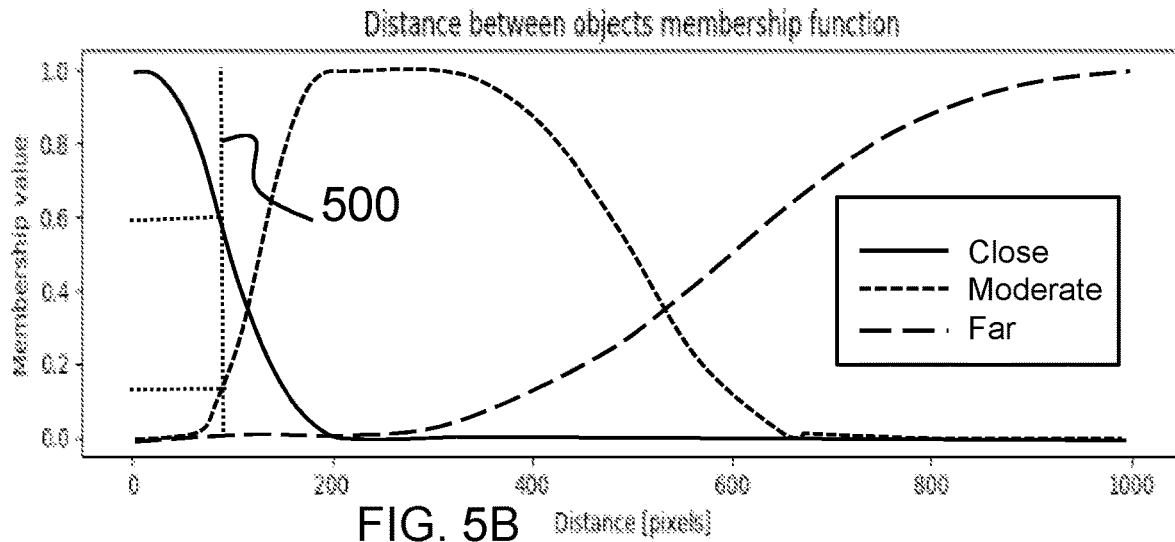
FIG. 5B is a graph depicting a fuzzy membership function for distance between objects.
Figure 5C:
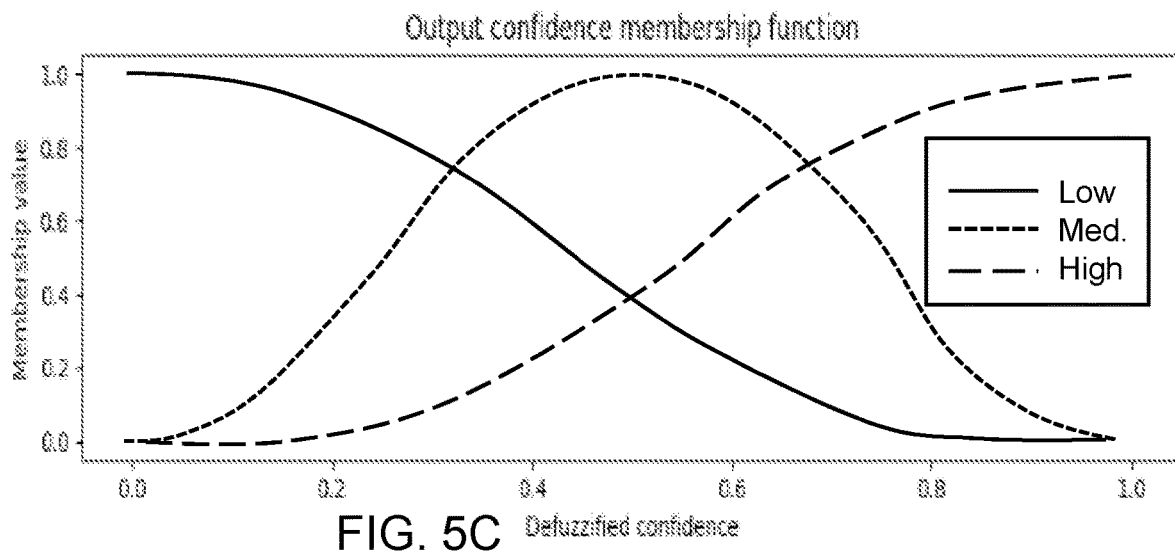
FIG. 5C is a graph depicting a fuzzy membership function for output confidence.

An example embodiment for the track speed and distance fuzzy membership functions is shown by the plots as depicted in FIGS. 5A and 5B. In FIG. 5A, the estimated speed of the object is mapped to sets for "slow", "moderate", and "fast" speeds. In FIG. 5B, the distance between two tracks based on their estimated positions is mapped to sets for "close", "moderate", and "far" distances. The vertical lines 500 represent example observations for a person with 1 pixel/frame speed and 90 pixels distance from another person. For example, the observations result in fuzzy membership values of 0.5 for "slow" speed and 0.6 for "close" distance. The observations also result in fuzzy membership values of approximately 0.09 and 0.13 for "moderate" speed and "moderate" distance, respectively, and approximately 0 and 0 for "fast" and "far", respectively. FIG. 5C shows the output fuzzy membership functions representing the fuzzy sets for confidence ("low", "medium", and "high"). The graph in FIG. 5C is used as an inverse map to find a final "defuzzified" confidence value when given membership values arrived from evaluating the user-defined fuzzy logic rules.

Figure 6:
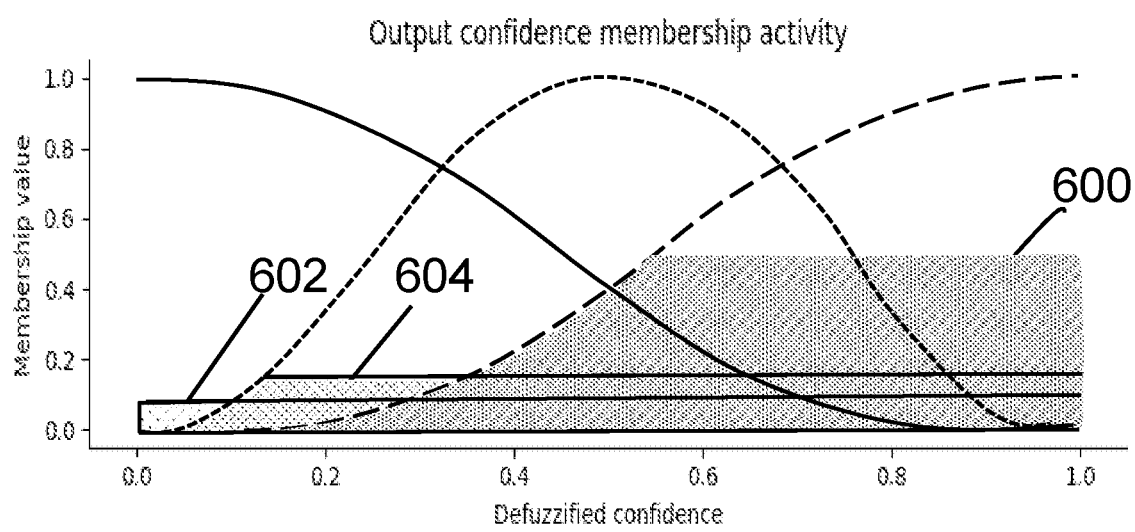
FIG. 6 is a graph depicting output confidence activations for the three output confidence membership functions representing the evaluation of the fuzzy logic rules based on the observations FIGS. 5A through 5C.

To work with these fuzzy membership function evaluations, fuzzy logic rules are defined to formalize the high-level activities. For illustrative purpose, non-limiting example of the high-level activities that are formalized include "two people convening" and "two people moving in the same direction". To offer a range of confidence values for the detection of these high-level activities, another set of three fuzzy membership functions for confidence is introduced, shown by FIG. 5C, that also map to the fuzzy sets of 'low', 'medium', and 'high'. There can be multiple embodiments of how one can define a fuzzy logic ruleset for a certain high-level activity, so provided below is one example for the case of 'high' confidence in the "two people convening" activity. This activity is systematically defined for two people, A and B, as "A is moving with 'low' speed and A has 'low' distance from B". In terms of the formalisms in fuzzy logic, the logical AND statement between the two conditions corresponds to the numerical minimum of the two membership values for the observations. The resulting value sets the upper bound for the 'high' output confidence membership function. For example, the observations in FIGS. 5A and 5B, denoted by the black lines 500, correspond to a 'slow' membership value of 0.5 and a 'close' membership value of 0.6—based on the defined fuzzy logic rules, the minimum of these two values, 0.5, is the membership value for the 'high' output confidence membership function, and as shown in FIG. 6, this value bounds the area 600 under the membership function. This area is the activation of the membership function given the observation. Fuzzy logic rules are similarly defined for the 'low' and 'medium' output confidence membership functions to arrive at the areas 602 and 604, respectively. The areas 602 and 604 indicate the degree (in the fuzzy logic sense) that there is "low" and "medium" confidence in this "two people convening" in the example activity.

For clarity, FIG. 6 provides the output confidence activations for the three output confidence membership functions representing the evaluation of the fuzzy logic rules based on the observations (black lines) in FIGS. 5A and 5B. For each of the three output confidence fuzzy sets, a membership value derived from the user-defined fuzzy logic rules sets a bound on the corresponding fuzzy membership function. The bounds are used to evaluate the area underneath each function, or the activation. For example, based on the observations in FIGS. 5A and 5B, and the fuzzy logic rule "if 'slow' speed and 'close' distance, then 'high' confidence for two people convening", a membership value of 0.5 is obtained—this is the bound on the "high" confidence fuzzy membership function, and the high confidence area 600 represents the belief that there is "high" confidence that the two people are convening.

Figure 7:
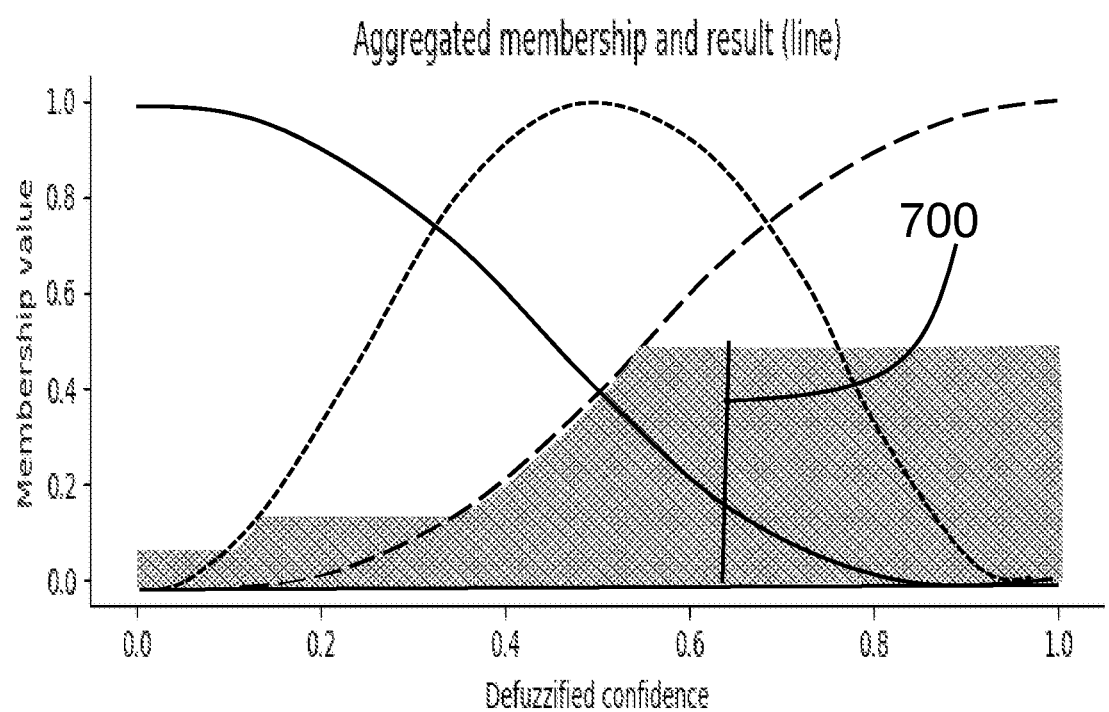
FIG. 7 is a graph depicting the aggregation, or maximum, of the three output confidence membership function activations in FIG. 6.

As shown in FIG. 7, this allows the system to aggregate all three activations in FIG. 6 and taking the centroid (center of mass) of the aggregated area arrives at a "defuzzified" confidence that, given the observations, represents the belief of the system in the activity "two people convening". Specifically, FIG. 7 is a graph depicting the aggregation, or maximum, of the three output confidence membership function activations in FIG. 6 with the centroid 700 (center of mass) denoted by the black line. The centroid 700 represents one method to arrive at a final "defuzzified" confidence value, which, based on the examples in FIGS. 5A through 5C and FIG. 6, represents the confidence that two people are convening.

In real-time operation, the fuzzy logic membership value and ruleset evaluations are parallelized through vectorized interpolations, minimums, maximums, and weighted averages involving the upper triangle of the pairwise matrices for the various observations. For example, if there are four 'Active' tracks being considered for the "two people convening" activity, the system can store the fuzzy logic calculations for the "object speed membership function" of FIG. 5A, the "distance between objects membership function" of FIG. 5B, etc. in four-by-four pairwise matrices where each of the rows and columns indicate one of the four tracks. The upper triangle of these matrices is sufficient to describe all of the possible pairwise combinations of the four tracks, and can be used to vectorize the fuzzy logic calculations. Since the algorithm described so far works on pairs of tracks, a graphical approach is used to find groups of three or more tracks that are engaged in these high-level activities together. For a certain activity, a graph node represents a track, and graph vertices represent pairs of tracks involved in the activity. The cliques of the graph constitute the final groups of tracks that are performing the high-level activity together.

(4.4) State Machine

Figure 8:
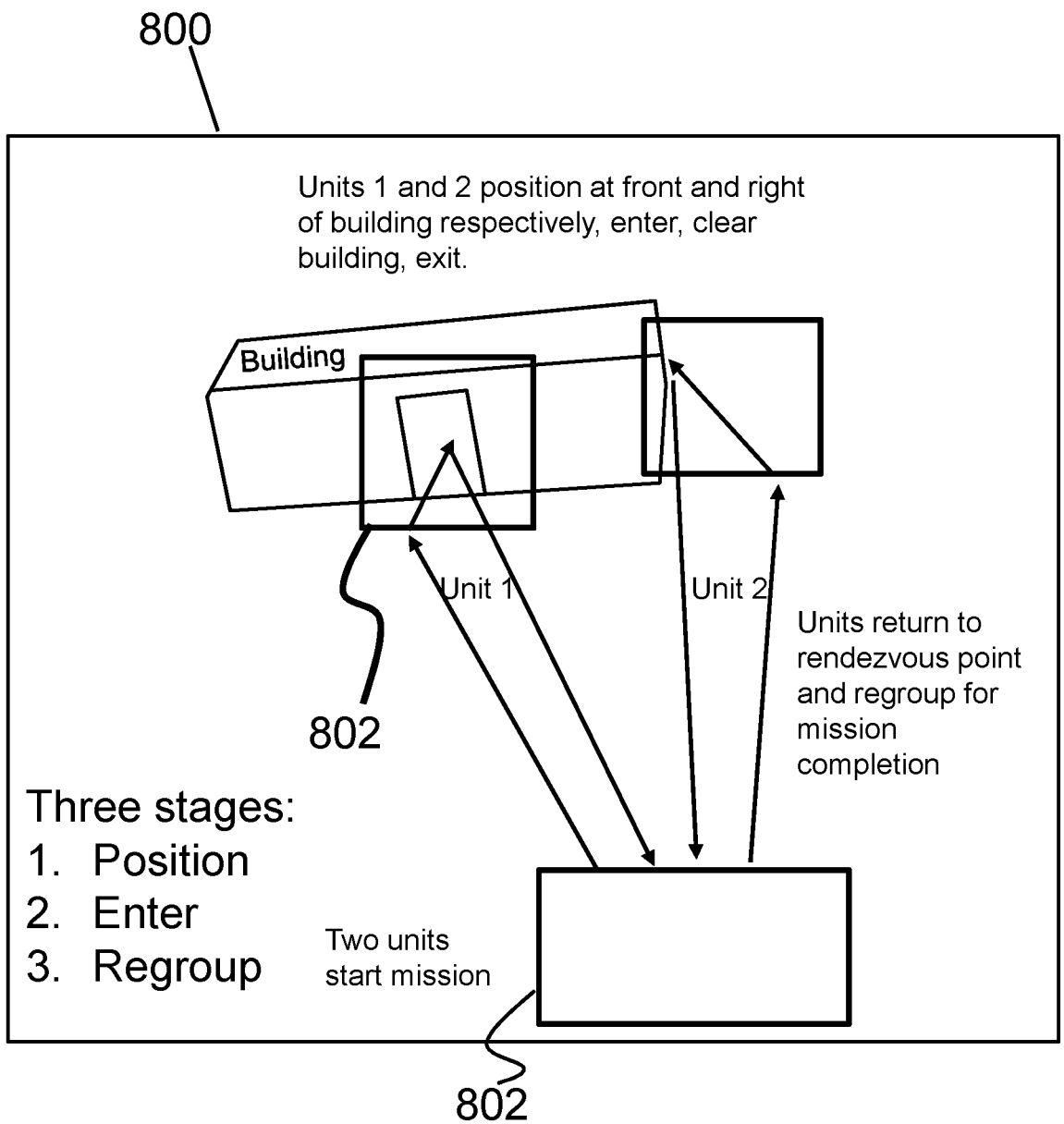
FIG. 8 is an illustration depicting three example mission phases: position, enter, and regroup.

The final stage of the mission (or activity) phase detection algorithm performs the actual mission phase detection through user-defined sequences of the high-level activities inferred by the fuzzy logic system. As a non-limiting example, three different mission/activity phases can be defined as: the "position" phase, where two units of soldiers or players starting from a specified rendezvous point take specific positions around a building; the "enter" phase, where the units enter the building; and the "regroup" phase, where the units leave the building and regroup at the rendezvous point. It should be understood that although specific examples are provided, such as building, enter, regroup, etc., the invention is not intended to be limited thereto as it can be implemented with any activity. In one example implementation, through a graphical user interface (GUI), the user can specify various locations (such as rendezvous and position locations) via bounding boxes on a video feed from the quadcopter. These bounding boxes and mission phases are visualized in FIG. 8. In other words, the GUI can display a video feed 800 via the system to a user. The user can then specify locations on the scene as depicted in the video feed using the bounding boxes 802. Then, with these specified regions of interest and the ability to detect the group activities of "multiple people convening" and "multiple people moving in the same direction", a state machine that cycles through the mission phases of interest can be defined and implemented.

First, to determine whether or not these group activities occur within the regions of interest, the multi-object tracker is used to determine a track's membership to these regions. The tracker stores the regions' bounding box information, so the system can tell whether tracks enter and leave the regions by checking the intersection of the boxes—in an alternative embodiment, the tracker can also track the bounding boxes in case the camera moves. However, to help prevent spurious tracks and non-solider (or other non-participant) actors within these regions from affecting the state machine that handles the mission phase detection, the system looks for semantically meaningful evidence from the track to establish that it represents a participant. For example, for the "position" phase, the soldier or participant slows down from his previous pace and potentially stops in the specified region before executing the next phase of the mission. This information is embedded in the fuzzy representation of the soldier's track, and this is used in a hysteresis-like manner to reject tracks that do not carry this semantic information from being considered as a valid soldier or participant within the region.

Then, with the ability to determine if the relevant group activities occur within the mission regions, a state machine is defined to determine how temporal sequences of these detected group activities can trigger the detection of a mission execution. There can be multiple embodiments of such a state machine to cover the various types of mission phases, one non-limiting example of which is depicted in FIG. 9.

Figure 9:
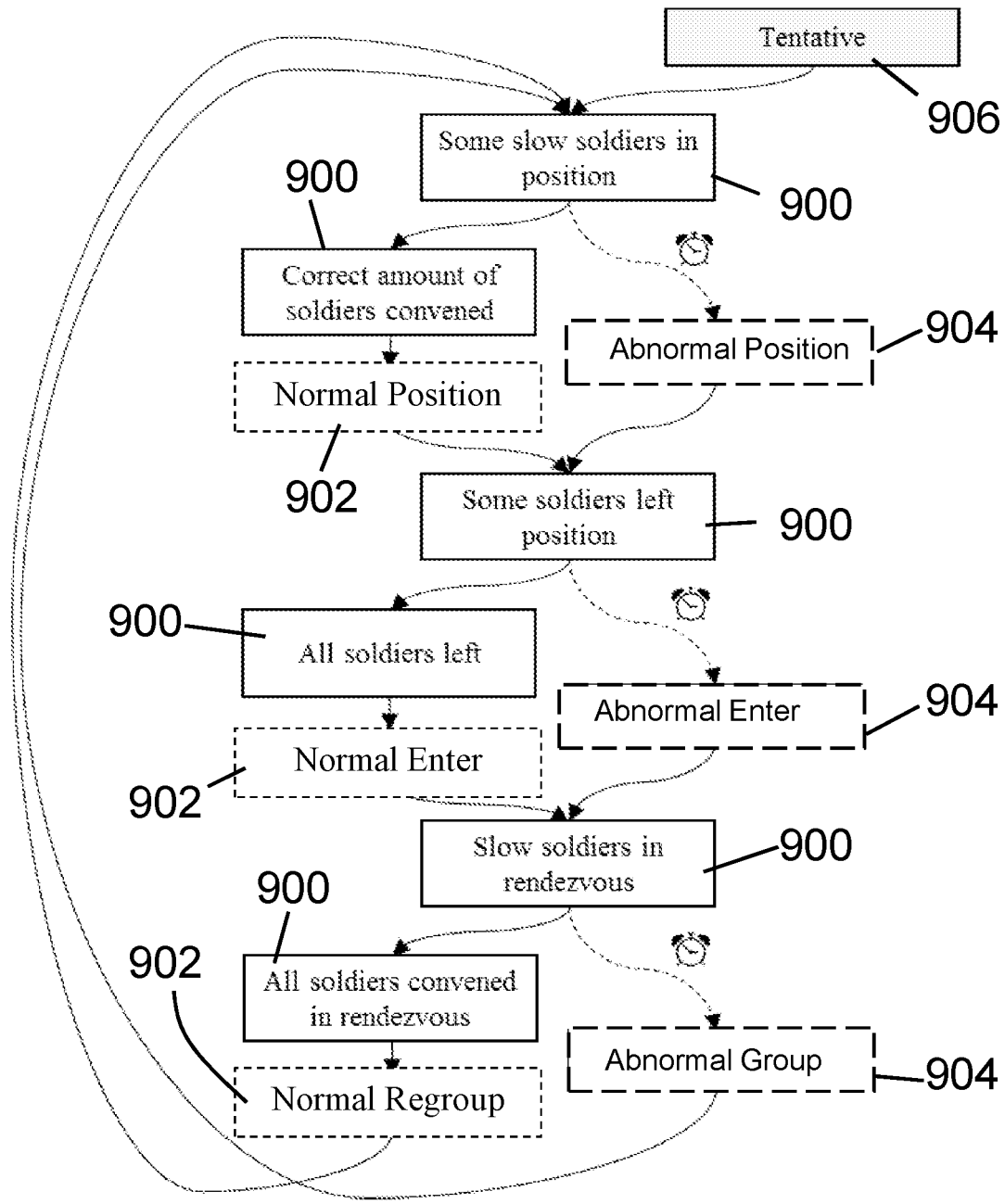
FIG. 9 is a flowchart depicting an example embodiment of a state machine for normal and abnormal mission phase classification.

Specifically, FIG. 9 is a flow chart depicting an example embodiment of a state machine for normal and abnormal mission phase classification. The boxes with solid outlines 900 show the observed conditions during the mission execution, the boxes with the small dashed outlines 902 are normal mission states, the with the large dashed outlines 904 are abnormal mission states, and the "Tentative" box 906 is the initial state. The solid lines between boxes indicate state transitions once the conditions are met. The dashed lines with clock symbols between the boxes indicate state transitions that occur if conditions are not met within a user-defined time period (temporal sequence of activities).

For the normal mission executions, certain conditions 900 need to be met in order for the state machine to enter the state indicating the normal mission classification 902. Within these conditions, one can construct the logic using semantic descriptions such as "slow" and "convening" because these are the actual inferences provided by the fuzzy logic system. This allows the user to easily extend the state machine or create new ones.

The possible anomalous events that cause abnormal mission executions can manifest in several ways. Non-limiting examples of which include incorrect amount of soldiers in each position or soldiers taking incorrect positions; soldiers entering building from incorrect positions or incorrect amount entering; and an incorrect amount of units regrouping at the rendezvous point. Although one can create states in the state machine for each of these anomalous events, doing so is not a tractable approach. Rather, once the state machine begins to meet the conditions of the normal mission state, the system initiates a time buffer (e.g., predetermined amount of time), shown by the dashed lines with clock symbols in FIG. 9, for all the conditions for the normal mission execution to be completed. If the conditions are not met within the time buffer, then the state machine transitions to the abnormal mission execution state. For example, in one scenario there are soldiers who have begun to take their position around a building; However, the expected amount of soldiers in each position is not observed in time, causing the system to classify the event as an abnormal execution of the "position" mission phase. To help the user gain more intuition behind the decision made by the system, the system can output a message to explain the reason behind the abnormality. For one example embodiment, FIG. 10 is a table depicting example message templates for the various abnormality explanations. Because most of the abnormalities can be explained by the incorrect amount of soldiers in the relevant regions, many of the messages relay such information on the interface.

(4.5) Example Implementations

The invention of the present disclosure has several example implementations for providing a framework of high-level semantics that can be used to characterize activities (e.g., manned-unmanned formations) in order to define various operational tactics. It is also a real-time algorithm that can detect and classify correct and incorrect executions of the defined tactics while giving live feedback to the person monitoring the system. The program can use this system to help coordinate operations in the real world as well as to demonstrate and practice the execution of various operations involving live participants (e.g., military personnel, sport players, etc.) on the ground. Thus, although some specific examples are provided, it should be understood that the invention is not intended to be limited thereto.

Figure 11:
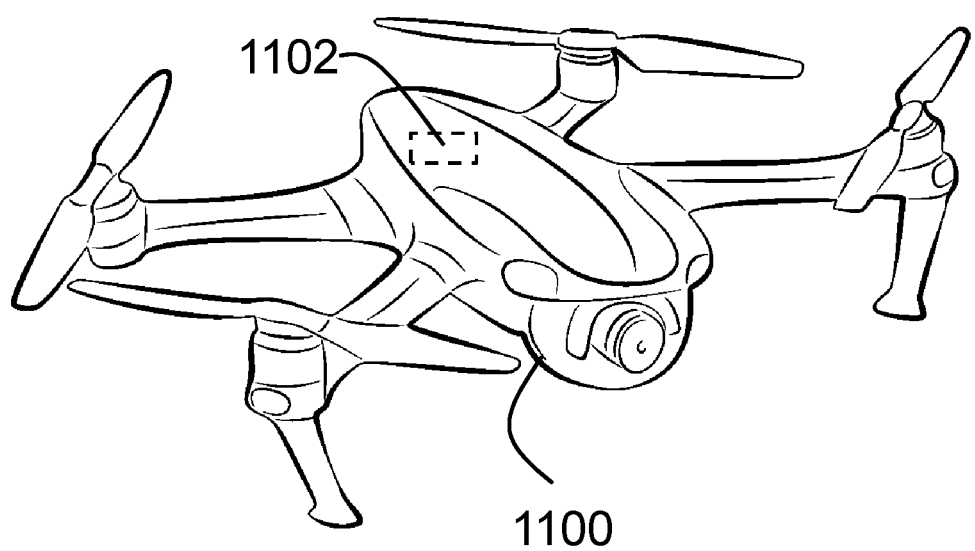
FIG. 11 is an illustration depicting an example implementation in which the system and method is implemented with an aerial drone.

In one example implementation as shown in FIG. 11, the invention has been implemented in a drone 1100 with an onboard processor 1102 that is programmed to perform the operations as described herein. For example, for demonstrative purposes, the method was pursued using a group of five people: one person operated the drone, one person operated the computer to draw the regions of interests related to the missions, and three people performed the mission phases for the demo. The three performers split into two units of soldiers, where the first unit contained two soldiers and the second unit contained one soldier. For the "position" phase, the first unit takes position on the lower-left side of a van as depicted in a video feed, and the second unit takes position on the lower-right side—these positions are shown by boxes on the associated GUI. Then for the "enter" phase, the two units disappear behind the van. And for the "regroup" phase, the two units convene at the rendezvous point, which would be shown by another box. Deviations from these specifications would result in an abnormal mission execution. The group performed each of the "position", "enter", and "regroup" mission phases five times, and all were classified correctly. Of the five "position" missions, the group performed two abnormally where the units took the opposite position from what they should have. Of the five "normal" missions, the group performed one abnormally where there was one soldier who did not enter. Of the five "regroup" missions, two were performed abnormally, where some soldiers failed to convene at the rendezvous point.

In this example implementation, the system processing the demo was an NVIDIA Jetson TX2 mounted on a DJI Matrice 210 quadcopter drone with the 72° field-of-view DJI Zenmuse X5S 3-axis gimbal camera. NVIDIA is located at 2788 San Tomas Expressway, Santa Clara, Calif. 95051, while DJI is located at the 14th Floor, West Wing, Skyworth Semiconductor Design Building, No. 18 Gaoxin South 4th Ave, Nanshan District, Shenzhen, China, 518057. The TX2 was mounted on a Connect Tech Orbitty carrier board for a smaller footprint, and a custom 3D-printed mount was designed to house the processor and a power regulation board (Texas Instruments LM3481-FLYBACKEVM) to limit the power from the quadcopter's batteries into the processor. Connect Tech Inc. is located at 42 Arrow Road, Guelph, Ontario, N1K 1S6 Canada, and Texas Instruments is located at 12500 TI Boulevard Dallas, Tex. 75243 USA. The resulting drone that was modified per the invention of the present disclosure was flown roughly 25-30 feet in altitude, and the gimbal camera was pitched 45° with respect to the nadir to observe the mission executions.

Figure 12:
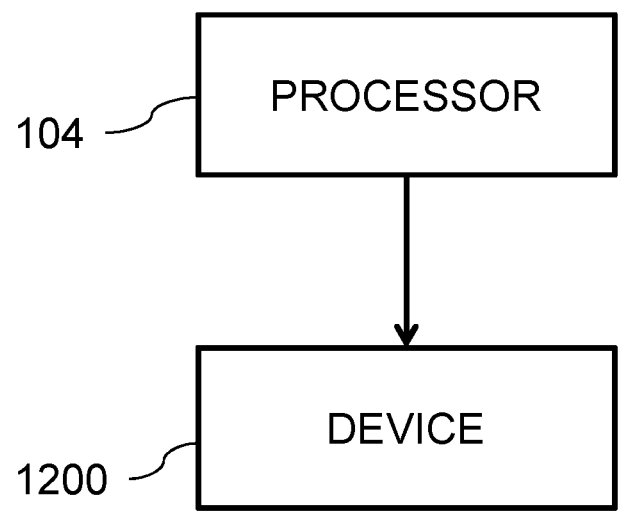
FIG. 12 is a block diagram depicting control of a device according to various embodiments.

In various embodiments, the result of the process described herein can be used to control a device. As shown in FIG. 12, the one or more processors 104 may be used to control a device 1200 (e.g., a mobile device display, a virtual reality display, an augmented reality display, a computer monitor, a motor, a machine, a drone, a camera, etc., or any other device as appropriate given the particular process and result according to the present invention) based on the result of performing the process as described herein. As understood by those skilled in the art, the particular device 1200 that is controlled depends on the process and result.

In one aspect, the device 1200 is a drone or UAV as referenced above. In one example, the invention does not issue any kinematic/control commands to the UAV (in this non-limiting example the UAV is controlled by a person); instead, the system as described herein gives situation awareness to a user in the form of a graphical display or data tokenization via a wireless network. In the first case (graphical display), the information from the UAV is meant to be seen by a person—this person can access the graphical display through some computer on the same wireless network as the UAV. In the second case (data tokenization), the information can be fed into some other system or algorithm for further processing. Specifically, this information tells us how many people or objects there are in the scene as detected by the object detection and tracking algorithm, what group activities the people in the scene are doing, and whether or not the people are executing the group activities correctly. An example of the usefulness for a person receiving this information is in a military strategy framework, where a high-level commander can see if the troops are performing the mission correctly. Another example of the usefulness for a system further along in the pipeline is that it can accept this information as input is to provide geotags for the detected people or to give kinematic controls to the UAV to follow the people.

In one aspect, fuzzy logic is used to convert statistics on person tracks to semantic concepts so that a person can define activities for the system to detect through semantics (e.g., if a person moves fast . . . ) instead of through hard-coded numeric thresholds that need to be hand-tuned (e.g., if a person's speed is greater than 0.8). A wireless link can be included between the UAV and the computer on the ground to be used by the end-user.

In another aspect, the UAV can use the person detections or the user-specified regions of interest to automatically follow the people or objects in a scene so that the execution of a particular activity/mission is within the UAV camera's field-of-view (through operational commands in the UAV to cause the UAV to maneuver and operate to follow a desired target). With the user-specified regions of interests set for the missions or group activities to be executed, and with the pixel locations of the person detections from the tracking module, the system can automatically steer the UAV so that the mission or group activity is within the field of view of the UAV's camera. In one example, an operator could first determine or otherwise input a course approximation of where the UAV should be by georeferencing the landmarks indicated by the image-based region of interest with a cached map database to determine geographic coordinates of where the mission or activity will take place. The UAV uses these geographic coordinates to automatically steer itself to a location where it can capture imagery of the people in the mission or activity. Then, once the tracking module detects activity by an object or person of interest, the extents of the pixel locations of the various people or objects are used to control the UAV gimbaled camera so that the people or desired objects (e.g., a vehicle to be tracked) are in the center of the field of view. In the case of the DJI Matrice 210 UAV, which was used in the reduction to practice, a simple feedback control algorithm can take the pixel coordinate extents of the group of people as feedback when controlling the gimbal's yaw and pitch in addition to the camera's zoom via the "DJI Onboard SDK" software API. If the system detected a successfully executed mission or activity, the UAV loads the region of interest for the next mission or activity to find the geographic coordinates, which serves as the next waypoint for the UAV to fly towards, and the process repeats. However, if the mission/activity detection module detected an abnormal execution of the mission/activity or some other anomaly, the UAV will continue to stay at the current location and follow the people or designated objects. The user interfacing with the UAV's graphical interface on the ground will be alerted and will be able to set alternative waypoints for the UAV to follow in case the current mission/activity needs to be aborted.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for onboard, real-time, activity detection and classification, the system comprising:
   one or more processors and a memory, the memory being a non-transitory computer-readable medium having executable instructions encoded thereon, such that upon execution of the instructions, the one or more processors perform operations of:
   detecting one or more objects in a scene using a mobile platform;
   tracking each of the one or more objects as the one or more objects move in the scene to generate tracks for each object;
   transforming the tracks using a fuzzy-logic based mapping to semantics that define group activities of the one or more objects in the scene; and
   determining, with a state machine, that the defined group activities are normal or abnormal phases of a predetermined group operation.

2. The system as set forth in claim 1, further comprising a graphical user interface, the graphical user interface operable for:
   receiving user drawn regions on a camera's field-of-view that directs the state machine to detect location-specific group activities; and
   providing an overlay over the camera's field-of-view that provides feedback to a user that indicates group activity detections.

3. The system as set forth in claim 1, wherein detecting the one or more objects in the scene is performed using a deep neural network.

4. The system as set forth in claim 1, wherein tracking each of the one or more objects is performed using a multi-object tracking algorithm that resolves tracks into various states.

5. The system as set forth in claim 1, wherein the state machine is defined by the semantics to determine the transition between various group activities that depend on a temporal sequence of group activities.

6. The system as set forth in claim 1, wherein in tracking each of the objects, a two-stage linear assignment problem between object detections and tracks is solved to prioritize tracks that receive consistent object detections over tracks that receive noisy or inconsistent object detections.

7. The system as set forth in claim 1, wherein in transforming the tracks using a fuzzy-logic based mapping, the mapping is a fuzzy logic membership function.

8. The system as set forth in claim 1, wherein in classifying with the state machine, a time buffer-based approach provides a predetermined amount of time for an activity to occur before defaulting to a classification of an alternate activity.

9. The system as set forth in claim 1, further comprising an operation of causing the mobile platform to move to maintain at least one of the objects within a field-of-view of the mobile platform.

10. A computer implemented method for onboard, real-time, activity detection and classification, the method comprising an act of:
    causing one or more processors to execute instructions encoded on a non-transitory computer-readable medium, such that upon execution, the one or more processors perform operations of:
    detecting one or more objects in a scene using a mobile platform;
    tracking each of the one or more objects as the one or more objects move in the scene to generate tracks for each object;
    transforming the tracks using a fuzzy-logic based mapping to semantics that define group activities of the one or more objects in the scene; and
    determining, with a state machine, that the defined group activities are normal or abnormal phases of a predetermined group operation.

11. The method as set forth in claim 9, further comprising a graphical user interface, the graphical user interface operable for:
    receiving user drawn regions on a camera's field-of-view that directs the state machine to detect location-specific group activities; and
    providing an overlay over the camera's field-of-view that provides feedback to a user that indicates group activity detections.

12. The method as set forth in claim 9, wherein detecting the one or more objects in the scene is performed using a deep neural network.

13. The method as set forth in claim 9, wherein tracking each of the one or more objects is performed using a multi-object tracking algorithm that resolves tracks into various states.

14. The method as set forth in claim 9, wherein the state machine is defined by the semantics to determine the transition between various group activities that depend on a temporal sequence of group activities.

15. The method as set forth in claim 9, wherein in tracking each of the objects, a two-stage linear assignment problem between object detections and tracks is solved to prioritize tracks that receive consistent object detections over tracks that receive noisy or inconsistent object detections.

16. The method as set forth in claim 9, wherein in transforming the tracks using a fuzzy-logic based mapping, the mapping is a fuzzy logic membership function.

17. The method as set forth in claim 9, wherein in classifying with the state machine, a time buffer-based approach provides a predetermined amount of time for an activity to occur before defaulting to a classification of an alternate activity.

18. The method as set forth in claim 9, further comprising an operation of causing the mobile platform to move to maintain at least one of the objects within a field-of-view of the mobile platform.

19. A computer program product for onboard, real-time, activity detection and classification, the computer program product comprising:
    a non-transitory computer-readable medium having executable instructions encoded thereon, such that upon execution of the instructions by one or more processors, the one or more processors perform operations of:

- detecting one or more objects in a scene using a mobile platform;
- tracking each of the one or more objects as the one or more objects move in the scene to generate tracks for each object;
- transforming the tracks using a fuzzy-logic based mapping to semantics that define group activities of the one or more objects in the scene; and
- determining, with a state machine, that the defined group activities are normal or abnormal phases of a predetermined group operation.

20. The method as set forth in claim 19, further comprising using a graphical user interface for:

- receiving user drawn regions on a camera's field-of-view that directs the state machine to detect location-specific group activities; and
- providing an overlay over the camera's field-of-view that provides feedback to a user that indicates group activity detections.

21. The method as set forth in claim 19, wherein detecting the one or more objects in the scene is performed using a deep neural network.

22. The method as set forth in claim 19, wherein tracking each of the one or more objects is performed using a multi-object tracking algorithm that resolves tracks into various states.

23. The method as set forth in claim 19, wherein the state machine is defined by the semantics to determine the transition between various group activities that depend on a temporal sequence of group activities.

24. The method as set forth in claim 19, wherein in tracking each of the objects, a two-stage linear assignment problem between object detections and tracks is solved to prioritize tracks that receive consistent object detections over tracks that receive noisy or inconsistent object detections.

25. The method as set forth in claim 19, wherein in transforming the tracks using a fuzzy-logic based mapping, the mapping is a fuzzy logic membership function.

26. The method as set forth in claim 19, wherein in classifying with the state machine, a time buffer-based approach provides a predetermined amount of time for an activity to occur before defaulting to a classification of an alternate activity.

27. The method as set forth in claim 19, further comprising an operation of causing the mobile platform to move to maintain at least one of the objects within a field-of-view of the mobile platform.

* * * * *